UNITED STATES PATENT OFFICE.

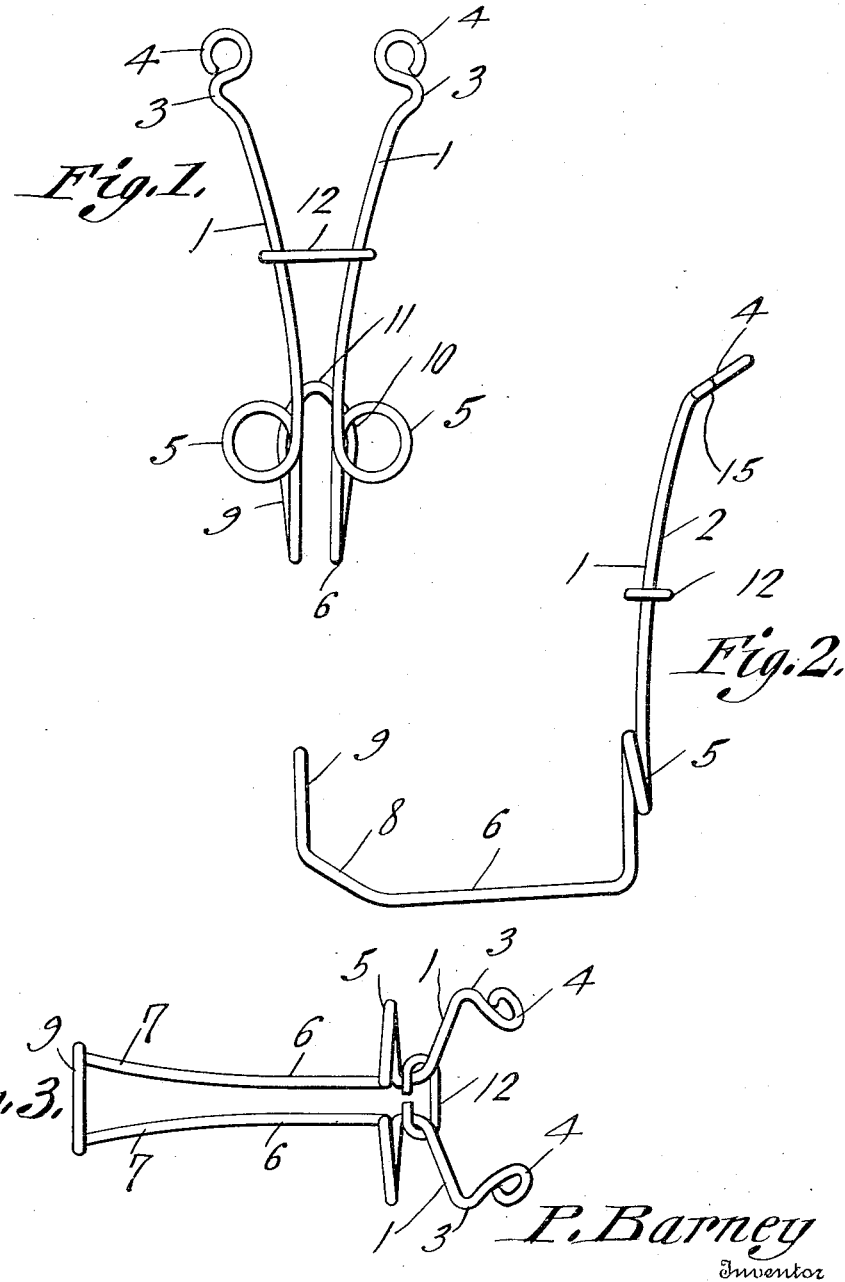

PHILIP BARNEY, OF DOLLARD, SASKATCHEWAN, CANADA.

GUARD.

1,284,558.  Specification of Letters Patent.  Patented Nov. 12, 1918.

Application filed November 14, 1917. Serial No. 202,082.

*To all whom it may concern:*

Be it known that I, PHILIP BARNEY, a citizen of the United States, residing at Dollard, in the Province of Saskatchewan and Dominion of Canada, have invented a new and useful Guard, of which the following is a specification.

It is the object of this invention to provide, in a simple one-piece form, a guard adapted to be assembled with the nose of a cow or bull to prevent such animals from poking through a fence, and adapted to be assembled with the nose of a calf to prevent the calf from sucking a teat during the weaning process, novel means being provided for securing a compression on the nose and a novel form of stop for the compression means being supplied.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the drawings:

Figure 1 shows in rear elevation, a guard constructed in accordance with the present invention;

Fig. 2 is a side elevation of the guard; and

Fig. 3 is a top plan of the guard.

The guard forming the subject matter of this application is a one-piece structure, made out of resilient metal, such as wire, and includes a pair of resilient diverging arms 1 which, as shown at 2 in Fig. 2 are bowed forwardly. Adjacent their upper ends, the arms 1 are bent outwardly to form seats 3 in which the cartilage of the nose of an animal may be received, to the end that pain may not be inflicted upon the animal. The seats 3 merge into loop-shaped eyes 4, constituting nose grips. As shown at 15 in Fig. 2, the seats 3 and the nose grips 4 slant rearwardly with respect to the arms 1. Intermediate their ends, and relatively near to their lower ends, the arms 1 are curved upon themselves to form closed outwardly extended stop convolutions 5. At their lower ends, the arms 1 merge into a loop, the side members of which are denoted by the reference character 6. The side members 6 of the loop, adjacent their inner ends, are disposed approximately at right angles to the arms 1, but adjacent their outer ends, the side members 6 of the loop diverge, as shown at 7, and these diverging portions 7 slant upwardly, as shown at 8 in Fig. 2, the portions 7 of the side members 6 of the loop merging into an upstanding bend 9, disposed approximately parallel to the arms 1. The bend 9 widens toward its upper end, as shown at 10 and terminates in a blunted point 11. A compression member 12, preferably in the form of a ring, slides on the arms 1 between the stop convolutions 5 and the seats 3.

It will be understood that the parts 4 are adapted to engage the nose of an animal, the cartilage of the nose being received in the seats 3. When the ring 12 is slid upwardly, the parts 4 will be made to grip the nose of an animal, and when the ring 12 is slid downwardly, the grip of the members 4 on the nose of the animal will be relieved, the convolutions 5 serving to prevent the ring 12 from sliding downwardly to an undue extent. Further, the convolutions 5 stiffen and strengthen the arms 1 and add resiliency thereto, so that the arms 1 normally tend to expand into diverging relation, as shown in Fig. 1, when the ring 12 is slid downwardly. The bend 9, and the parts 7 and 6 coöperate to form a hook which, being engaged with a fence, will prevent the animal from nosing its way through a fence. Owing to the fact that the parts 7 are inclined as shown at 8, the fence wire is not lodged at an abrupt angle, and the device is not likely to be entangled in a fence, although it is thoroughly efficient to prevent an animal from poking its way through a fence. Since the arms 1 are bowed outwardly as shown at 2, the hook-shaped bottom portion of the device is prominently presented to engage with an object of any kind, such as a fence.

Having thus described the invention what is claimed is:

1. A guard of the class described, comprising in a one-piece structure, a pair of resilient diverging arms provided at their upper ends with nose grips, the arms merging at their lower ends into a projecting loop disposed at an angle to the arms, the loop terminating in a bend arranged approximately parallel to the arms and defining a hook; and a compression member slidable upon the arms, the arms being bent upon themselves to form stop convolutions for the compression member, the compression member being disposed between the stop convolutions and the nose grips.

2. A guard of the class described comprising in a one-piece structure, a pair of resilient diverging arms outwardly bowed at their upper ends, to form nose seats, and bent at their upper ends to form eyes constituting nose grips, the arms merging at their lower ends into a projecting loop disposed at an angle to the arms, the loop terminating in a bend arranged approximately parallel to the arms and defining a hook; and a compression member insertible upon the arms, the arms being distorted adjacent their lower ends to form stops, and the compression member being slidable on the arms, between the stops and the seats.

In testimony that I claim the foregoing as my own, I have hereto affixed my signature in the presence of two witnesses.

PHILIP BARNEY.

Witnesses:
I. McDERMOTT,
LUCIEN TOURIGNY.

Copies of this patent may be obtained for five cents each, by addressing the "Commissioner of Patents, Washington, D. C."